Nov. 28, 1967   T. J. ROCHE ETAL   3,354,523
DETACHABLE FASTENER
Filed Feb. 19, 1965
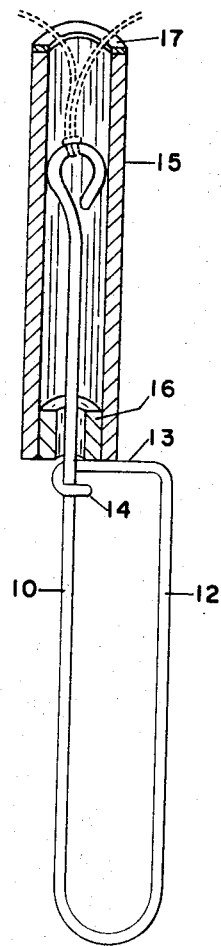
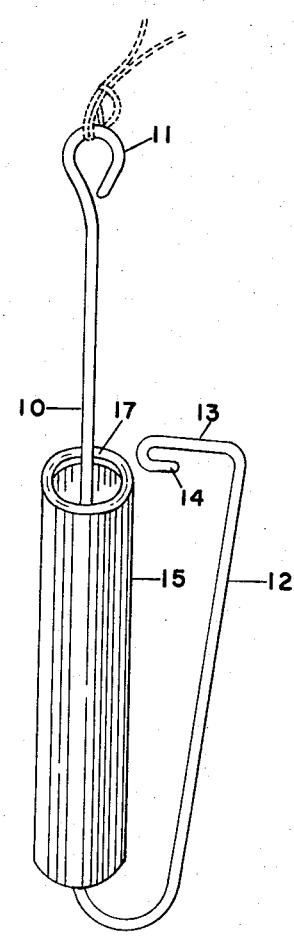
Fig-1-    Fig-2-
THOMAS J. ROCHE & RALPH J. MENTZER
INVENTORS
BY W.B.Harpman

United States Patent Office 3,354,523
Patented Nov. 28, 1967

3,354,523
DETACHABLE FASTENER
Thomas J. Roche, 4336 Market St. 44512, and Ralph J. Mentzer, 3620 Southern Blvd. 44507, both of Youngstown, Ohio
Filed Feb. 19, 1965, Ser. No. 433,885
4 Claims. (Cl. 24—238)

This invention relates to a detachable fastener and more particularly to a fastener which provides a quick and easy means of attaching a fish hook to a fishing line.

The principal object of the invention is the provision of a detachable fastener which is simple in construction, easy to operate, and which will provide a convenient means of attaching a fish hook to a fishing line.

A further object of the invention is the provision of a detachable fastener including means for securing the fishing line thereto and for securing a hook to the fastener.

A still further object of the invention is the provision of a detachable fastener that can be attached to a fishing line very quickly and removed very quickly and which will not harm the line.

A still further object of the invention is the provision of a detachable fastener which will detachably receive the hook and leader with respect to the fishing line and hold the same securely.

Those skilled in the art will observe that most fishermen have trouble securing hooks to the fishing line, as well as removing hooks from the line, as hooks tied to the line have a tendency to become so tight that they are very difficult to remove.

The present invention relates to a detachable fastener which is in the nature of a snap device that can be attached to the line in seconds and removed equally fast. It will not slide if attached properly, and, more importantly, it will not be harmful to the line. It can be used in every method of fishing. It can be made in various sizes, depending on the type of fishing that is involved. It forms an extremely convenient means of attaching a hook or a hook and leader to a fishing line in a manner that makes them readily detachable when desired.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the detachable fastener with parts broken away and parts in cross section.

FIGURE 2 is a perspective view of the detachable fastener in open position to receive a line and a hook or hook leader.

By referring to the drawing and FIGURE 1 in particular, it will be seen that the detachable fastener disclosed herein comprises a wire body member 10 having an eyelet 11 at its uppermost end and having its lower portion doubled back in spaced relation in the form of a secondary body member 12, the upper end 13 of which is disposed at a right angle to the secondary body member 12 and provided with a hook 14 thereon. The hook 14 is adapted to be engaged on the body member 10 at a midway between its upper and lower ends, and the wire material of the body member 10 and secondary portion 12 thereof is preferably of a spring nature so that it has a normal tendency to move away from its engagement, as shown in FIGURE 1, to a position as illustrated in FIGURE 2 of the drawing.

Still referring to FIGURE 1 of the drawing, it will be seen that there is a tubular member 15 having a bushing 16 in its lowermost end positioned for slidable motion on the upper end of the body member 10. The tubular member 15 is of an inner diameter that closely fits the outer diameter of the eyelet 11 on the body member 10. The upper end of the tubular member 15 is preferably provided with a resilient washer 17, which is secured thereto. Alternately, the tubular member 15 and the washer 17 may be formed integrally of a relatively resilient plastic material. The bushing 16 prevents the tubular member 15 from moving out of engagement with the body member 10, and particularly eyelet 11, as the eyelet will not pass through the relatively small diameter opening in the bushing 16.

In use, the detachable fastener is in the position illustrated in FIGURE 1 with a fishing line entering through the open upper end of the tubular member 15 and being secured to the eyelet 11. Preferably, the fishing line is doubled to form a loop, the loop positioned through the eyelet 11, and the remainder of the fishing line then passed through the loop, which is then pulled tight to become securely engaged to the eyelet 11, and hence the body member 10.

The attachment of the line to the eyelet 11 is done when the detachable fastener is in open position as seen in FIGURE 2 of the drawing, and by referring thereto it will be noted that when the hook 14 on the upper end 13 of the secondary body member 12 is detached from its normal engagement on the body member 10 it will move outwardly and away therefrom by its normal resilence, which will permit the tubular member 15 to be moved downwardly on the body member 10. This will expose the eyelet 11 and permit the fishing line to be readily attached thereto, as heretofore described. When the line is so attached, the tubular member 15 is moved upwardly on the body member 10 so that it slides over the eyelet 11 and so that its lowermost end is positioned above the end portion 13 of the secondary body member 12 of the device. This can then be moved back into hooked engagement, as shown in FIGURE 1 of the drawing.

It will occur to those skilled in the art that the device permits the ready attachment of a hook or a leader to the body member 10 and the secondary body member 12 so that it is normally engaged thereon at the lowermost end thereof. It will also be seen that when the tubular member 15 is in uppermost position, as seen in FIGURE 1, it cannot move downwardly by reason of the positioning of the upper end 13 of the secondary body member 12, which therefore holds it it position over the eyelet 11 and thus secures the fishing line to the eyelet 11.

In order to release the fishing line from the hook or the leader attached to the detachable fastener, the hook 14 is released, the body member 12 moved outwardly to the position shown in FIGURE 2, the tubular member 15 moved downwardly to the position shown in FIGURE 2 whereupon the line looped about the eyelet 11 may be easily disconnected therefrom by slipping off the open end of the eyelet 11.

It will thus be seen that a detachable fastener particularly suited for joining fishing lines to hooks and leaders therefor has been disclosed which meets the several objects of our invention, and having thus described our invention what we claim is:

1. A detachable fastener comprising an elongated resilient body member having a portion provided with an eyelet at the upper end thereof, a secondary portion of said body member being joined to the opposite, lower end of said elongated body member and positioned in spaced parallel relation to said first-named portion, the free end of said secondary portion being disposed at right angles thereto and having a hook thereon engageable with said elongated body member, and a tubular member slidably disposed on said elongated body member and disposed above said hook, and having means therein engageable with said eyelet to prevent said tubular member from being removed from said elongated body member, said tubular member being of a length extending from said hook beyond said eyelet when said hook is engaged with said elongated body member.

2. The fastener set forth in claim 1 and wherein the elongated body member, including its secondary portion and the end and hook thereof, is formed of resilient wire.

3. The fastener set forth in claim 1 and wherein the tubular member is formed of a resilient plastic material.

4. The fastener set forth in claim 1 and wherein said eyelet has a narrow opening adjacent said elongated body member.

References Cited

UNITED STATES PATENTS

| 1,546,701 | 7/1925 | Bailer | 43—43.13 |
| 2,845,743 | 8/1958 | Boyd | 43—42.15 |

WILLIAM FELDMAN, *Primary Examiner.*

E. SIMONSEN, *Assistant Examiner.*